(12) United States Patent
Sugawara et al.

(10) Patent No.: US 9,824,724 B2
(45) Date of Patent: Nov. 21, 2017

(54) MAGNETIC RECORDING DEVICE CAPABLE OF IMPLEMENTING READ AFTER WRITE

(71) Applicant: KABUSHIKI KAISHA TOSHIBA, Tokyo (JP)

(72) Inventors: Katsuya Sugawara, Kanagawa (JP); Kenichiro Yamada, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 15/244,559

(22) Filed: Aug. 23, 2016

(65) Prior Publication Data
US 2017/0062017 A1  Mar. 2, 2017

(30) Foreign Application Priority Data

Aug. 24, 2015 (JP) .................................. 2015-165199

(51) Int. Cl.
| | | |
|---|---|---|
| *G11B 5/09* | (2006.01) | |
| *G11B 27/36* | (2006.01) | |
| *G11B 20/10* | (2006.01) | |
| *G11B 20/18* | (2006.01) | |

(52) U.S. Cl.
CPC ........ *G11B 27/36* (2013.01); *G11B 20/10009* (2013.01); *G11B 20/18* (2013.01); *G11B 20/182* (2013.01); *G11B 2020/1087* (2013.01)

(58) Field of Classification Search
None
See application file for complete search history.

(56) References Cited

U.S. PATENT DOCUMENTS

| | | | | |
|---|---|---|---|---|
| 5,469,418 A | * | 11/1995 | Satoh ....................... | G11B 7/14 369/111 |
| 5,471,351 A | * | 11/1995 | Ishiguro ............. | G11B 20/1833 360/31 |
| 5,909,334 A | | 6/1999 | Barr et al. | |
| 6,141,164 A | * | 10/2000 | Ishibashi ............ | G11B 20/1809 360/53 |
| 6,578,164 B1 | | 6/2003 | Stokes et al. | |
| 2008/0019030 A1 | * | 1/2008 | Nakao .................... | B82Y 25/00 360/31 |
| 2013/0148225 A1 | * | 6/2013 | Coker .................. | G11B 19/045 360/31 |

FOREIGN PATENT DOCUMENTS

| | | |
|---|---|---|
| JP | 8-180605 | 7/1996 |
| JP | 2000-134114 | 5/2000 |

* cited by examiner

*Primary Examiner* — Tan X Dinh
(74) *Attorney, Agent, or Firm* — Finnegan, Henderson, Farabow, Garrett & Dunner, L.L.P.

(57) ABSTRACT

According to one embodiment, a magnetic recording and reproducing device includes a magnetic recording medium including a plurality of recording tracks, a magnetic head, and a controller. The plurality of recording tracks includes a first track. The controller causes the magnetic head to implement a first recording operation of recording first information in at least two of a plurality of first track recording components included in the first track. The controller causes the magnetic head to implement a first reproduction operation of reproducing the first information from a first information reproducing/recording component of one of the at least two of the plurality of first track recording components.

15 Claims, 5 Drawing Sheets

MAGNETIC RECORDING DEVICE CAPABLE OF IMPLEMENTING READ AFTER WRITE

CROSS-REFERENCE TO RELATED APPLICATIONS

This application is based upon and claims the benefit of priority from Japanese Patent Application No. 2015-165199, filed on Aug. 24, 2015; the entire contents of which are incorporated herein by reference.

FIELD

Embodiments described herein relate generally to a magnetic recording and reproducing device.

BACKGROUND

It is desirable to increase the recording density of a magnetic recording and reproducing device.

DESCRIPTION OF EMBODIMENTS

According to one embodiment, a magnetic recording and reproducing device includes a magnetic recording medium including a plurality of recording tracks, a magnetic head, and a controller. The plurality of recording tracks includes a first track. The controller causes the magnetic head to implement a first recording operation of recording first information in at least two of a plurality of first track recording components included in the first track. The controller causes the magnetic head to implement a first reproduction operation of reproducing the first information from a first information reproducing/recording component of one of the at least two of the plurality of first track recording components.

Various embodiments will be described hereinafter with reference to the accompanying drawings.

The drawings are schematic and conceptual; and the relationships between the thickness and width of portions, the proportions of sizes among portions, etc., are not necessarily the same as the actual values thereof. Further, the dimensions and proportions may be illustrated differently among drawings, even for identical portions.

In the specification and drawings, components similar to those described or illustrated in a drawing thereinabove are marked with like reference numerals, and a detailed description is omitted as appropriate.

First Embodiment

FIG. 1A to FIG. 1F are schematic views illustrating a magnetic recording and reproducing device according to a first embodiment.

Figure 1A:
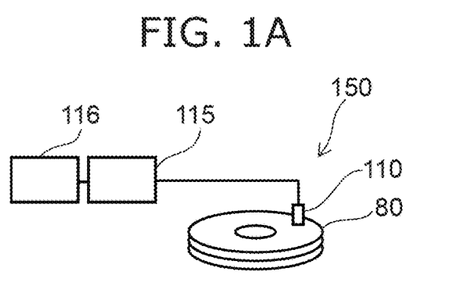
FIG. 1A to FIG. 1F are schematic views illustrating a magnetic recording and reproducing device according to a first embodiment.
Figure 1B:
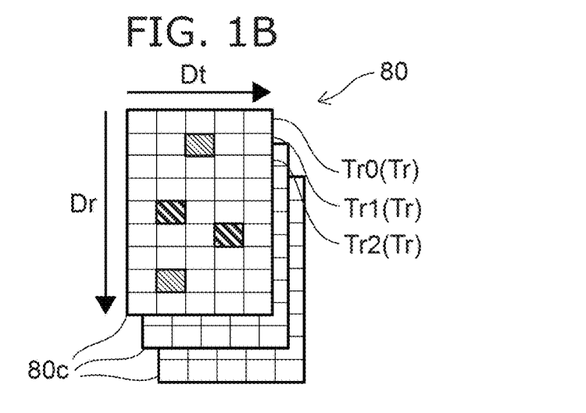

FIG. 1A is a block diagram. FIG. 1B is a schematic view illustrating a portion of the magnetic recording and reproducing device. FIG. 1C to FIG. 1F are schematic views illustrating operations of the magnetic recording and reproducing device.

As shown in FIG. 1A, the magnetic recording and reproducing device 150 according to the embodiment includes a magnetic recording medium 80, a magnetic head 110, and a controller 115. In the example, an interface 116 is further provided.

Data (information) that is acquired via the interface 116 is recorded in the magnetic recording medium 80. The data that is recorded in the magnetic recording medium 80 is reproduced and extracted via the interface 116. The recording and reproducing are performed by the magnetic head 110. The controller 115 controls the operations of the magnetic head 110. For example, a signal is supplied to the magnetic head 110 from the controller 115. Based on the signal, the magnetic head 110 records the data in the magnetic recording medium 80. The magnetic recording medium 80 is, for example, a magnetic disk.

As shown in FIG. 1B, the magnetic recording medium 80 includes, for example, multiple recording tracks Tr (tracks). Each of the multiple recording tracks Tr extends along a track direction Dt (a down-track direction). For example, the track direction Dt is substantially aligned with the circumference of the magnetic disk. The multiple recording tracks Tr are arranged in a track width direction Dr. The track width direction Dr is a radial direction passing through the rotation axis of the magnetic disk. Multiple cylinders 80c are provided in the example. Multiple recording regions (e.g., a sector) are provided in each of the multiple recording tracks Tr.

Thus, the magnetic recording medium 80 includes the multiple recording tracks Tr. The multiple recording tracks Tr include, for example, a first track Tr1, a second track Tr2, etc. The multiple recording tracks Tr includes a track Tr0.

Examples of the operations of the magnetic recording and reproducing device 150 will now be described. For example, the following operations are performed by the controller 115.

Figure 1C:
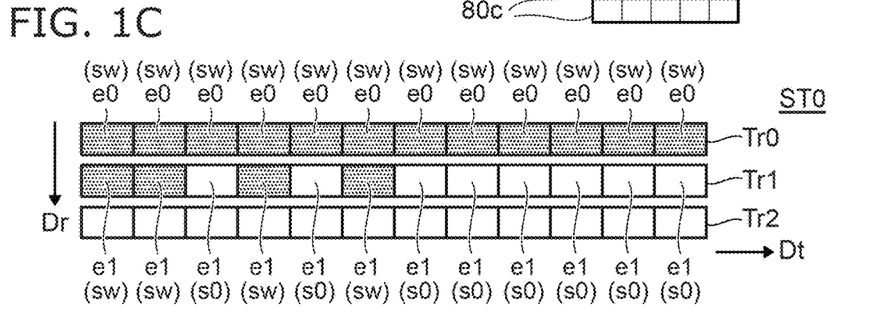
Figure 1D:
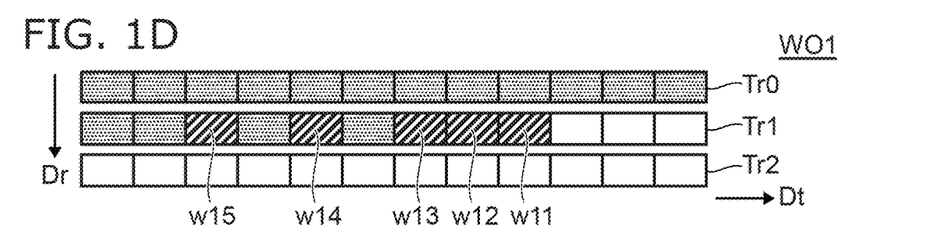
Figure 1E:
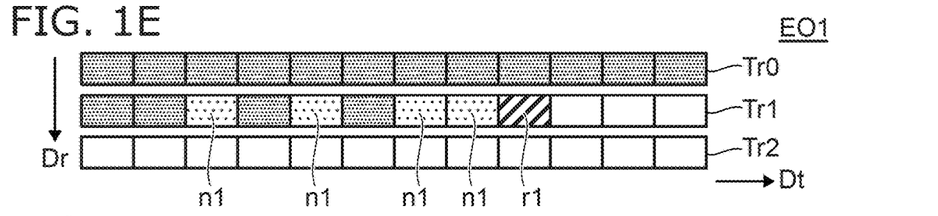
Figure 1F:
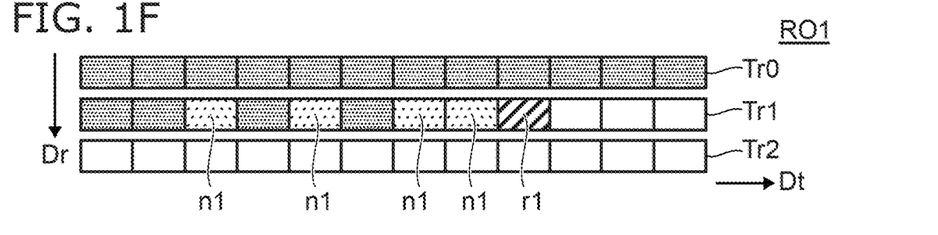

FIG. 1C illustrates an initial state ST0. FIG. 1D illustrates a first recording operation WO1. FIG. 1E illustrates a first evaluation operation EO1. FIG. 1F illustrates a first reproduction operation RO1.

As shown in FIG. 1C, multiple track recording components e0 are provided in the track Tr0. The multiple track recording components e0 are arranged along the track direction Dt. In the example, the multiple track recording components e0 are in a recorded state sw (a state in which information is recorded). For example, the multiple track recording components e0 correspond to a sector.

The first track Tr1 includes multiple first track recording components e1. The multiple first track recording components e1 are arranged along the track direction Dt. A portion of the multiple first track recording components e1 is in the recorded state sw. Another portion of the multiple first track recording components e1 is in a state s0 prior to recording. The multiple first track recording components e1 correspond to a sector.

In the example, multiple track recording components included in the first track Tr1 are in the state s0 prior to recording. For example, the multiple track recording components included in the first track Tr1 correspond to a sector.

As shown in FIG. 1D, in the first recording operation WO1, first information is recorded in at least two of the multiple first track recording components e1 included in the first track Tr. In the example, the multiple first track recording components e1 include recording components w11, w12, w13, w14, and w15. The first information is recorded in these five recording components. In the embodiment, the number of recording components in which the first information is recorded is two or more. The number of recording components in which the first information is recorded is any number not less than two.

Generally, the information (the first information) to be recorded is recorded in one recording component. Conversely, in the embodiment, the information (the first information) to be recorded is recorded in multiple recording components (the recording components w11, w12, w13, w14, w15, etc.).

In other words, the controller 115 causes the magnetic head 110 to implement the first recording operation WO1. In the first recording operation WO1, the first information is recorded in at least two (e.g., the recording components w11, w12, w13, w14, w15, etc.) of the multiple first track recording components e1 included in the first track Tr1.

In the first evaluation operation EO1 as shown in FIG. 1E, the recorded states of the multiple recording components recited above in which the first information is recorded are evaluated. Then, based on the result, a designated recording component is determined from the multiple recording components. The designated recording component is called a first information reproducing/recording component r1.

Then, in the first reproduction operation RO1 as shown in FIG. 1F, the first information is reproduced from the first information reproducing/recording component r1 of one of the at least two (e.g., the recording components w11, w12, w13, w14, w15, etc.) of the multiple first track recording components e1 recited above. This operation is performed by the controller 115. In other words, the controller 115 causes the magnetic head 110 to implement the first reproduction operation of reproducing the first information from the first information reproducing/recording component r1 of one of the at least two of the multiple first track recording components e1 recited above.

The first information reproducing/recording component r1 is, for example, a recording component having a good recorded state. The first information reproducing/recording component r1 that has the good recorded state is used as the recording component in which the first information is recorded. For example, the other recording components are used as non-recorded recording components to be used in a new recording at a subsequent time.

For example, the recording component that is recorded in the good state is used to record the first information (the final recording); and the other recording components are used to record other information. Thereby, for example, the margin of the design of one recording component widens. Thereby, for example, the size of one recording component can be small. Thereby, the recording density can be increased.

Thus, the first information reproducing/recording component r1 is determined in the first evaluation operation EO1 recited above shown in FIG. 1E. In other words, the controller 115 implements the first evaluation operation EO1. In the first evaluation operation EO1, the controller 115 determines the first information reproducing/recording component r1 based on the at least two recorded states of the multiple first track recording components e1 recited above. For example, in the first evaluation operation EO1, the magnetic head 110 is caused to reproduce the information (the information corresponding to the first information) recorded in the at least two (e.g., the recording components w11, w12, w13, w14, w15, etc.) of the multiple first track recording components e1 recited above. Then, the first information reproducing/recording component r1 is determined based on the reproduction result of the recorded information. The first information reproducing/recording component r1 is, for example, a recording component of the at least two (e.g., the recording components w11, w12, w13, w14, w15, etc.) of the multiple first track recording components e1 recited above that has a good recorded state.

The recording component other than the first information reproducing/recording component r1 is used as a non-first information reproducing/recording component n1. In other words, the at least two (e.g., the recording components w11, w12, w13, w14, w15, etc.) of the multiple first track recording components e1 recited above include the non-first information reproducing/recording component n1 that is different from the first information reproducing/recording component r1. In the example shown in FIG. 1E, the recording component w11 is used as the first information reproducing/recording component r1. The recording components w12, w13, w14, and w15 are used as the non-first information reproducing/recording components n1.

The first reproduction operation RO1 includes reproducing the first information from the first information reproducing/recording component r1 determined by the first evaluation operation EO1. The non-first information reproducing/recording components n1 (the recording components w12, w13, w14, and w15) are to be used in a new recording at a subsequent time.

In the example recited above, one piece of information is recorded in multiple recording components included in one track (the first track Tr1). By recording the one piece of information in each of the multiple recording components included in the one track, for example, this operation can be implemented in one rotation of the magnetic disk. The time of this operation can be short; and a high-speed operation can be implemented.

In the embodiment, the one piece of information may be recorded in multiple recording components included in each of the multiple recording tracks Tr (the first track Tr1, the second track Tr2, etc.).

Figure 2A:
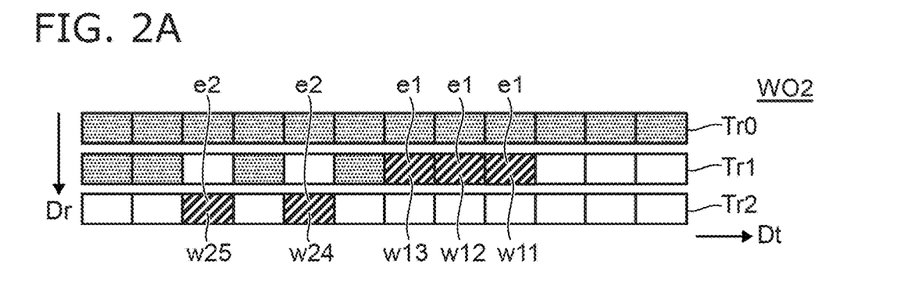
FIG. 2A to FIG. 2C are schematic views illustrating other operations of the magnetic recording and reproducing device according to the first embodiment.
Figure 2B:
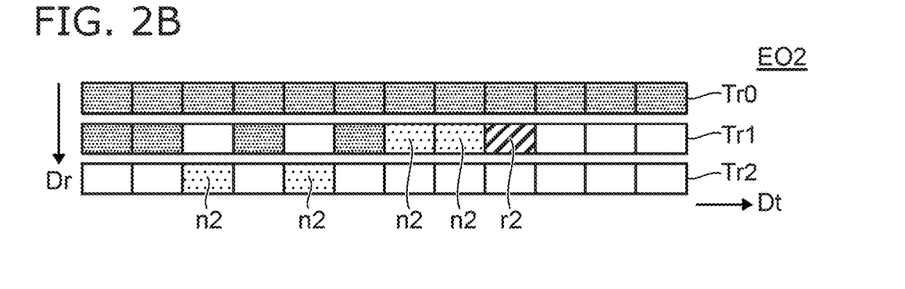
Figure 2C:
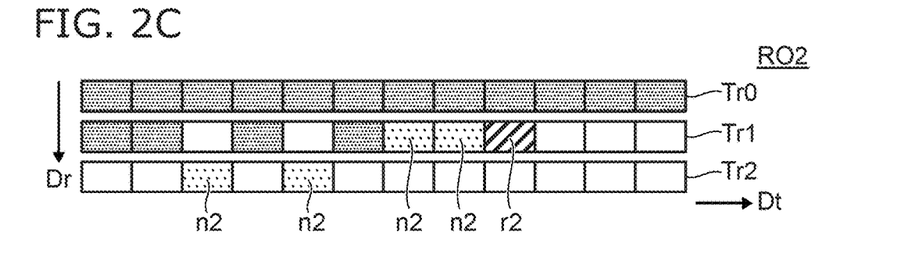

FIG. 2A to FIG. 2C are schematic views illustrating other operations of the magnetic recording and reproducing device according to the first embodiment.

FIG. 2A illustrates a second recording operation WO2. FIG. 2B illustrates a second evaluation operation EO2. FIG. 2C illustrates a second reproduction operation RO2.

As shown in FIG. 2A, the multiple recording tracks Tr further include the second track Tr2 in addition to the first track Tr1. The controller 115 causes the magnetic head 110 to implement the second recording operation WO2.

The second recording operation WO2 records second information in at least two of the recording components. The at least two of the recording components are selected from the multiple first track recording components e1 (in the example, the recording components w11, w12, and w13) included in the first track Tr1 and multiple second track recording components e2 (in the example, recording components w24 and w25) included in the second track Tr2.

For example, the second recording operation WO2 may record the second information in at least two (in the example, the recording components w11, w12, and w13) of the multiple first track recording components e1 included in the first track Tr1, and in at least one (in the example, the recording components w24 and w25) of the multiple second track recording components e2 included in the second track Tr2.

In the second evaluation operation EO2 as shown in FIG. 2B, for example, the controller 115 determines a second information reproducing/recording component r2. In the example, the recording component w11 is used as the second information reproducing/recording component r2; and the recording components w12, w13, w24, and w25 are used as non-second information reproducing/recording components n2. In the embodiment, one of the multiple second track recording components e2 may be used as the second information reproducing/recording component r2. For example, the recording component w24 may be used as the second information reproducing/recording component r2; and the recording components w11, w12, w13, and w25 may be used as the non-second information reproducing/recording components n2.

As shown in FIG. 2C, the controller 115 causes the magnetic head 110 to implement the second reproduction operation RO2. In the second reproduction operation RO2, the second information is reproduced from the second information reproducing/recording component r2. The second information reproducing/recording component r2 is one of the at least two of the multiple first track recording components e1 recited above or the at least one of the multiple second track recording components e2 recited above.

In such a case, the second information reproducing/recording component r2 is a recording component of the multiple recording components in which the second information is recorded that has a good recorded state. Good recording and reproducing can be implemented by selecting the recording component having the good recorded state as the second information reproducing/recording component r2.

For example, in the second evaluation operation EO2 shown in FIG. 2B, the controller 115 causes the magnetic head 110 to reproduce the recorded second information from the multiple first track recording components e1 and the multiple second track recording components e2. The controller 115 determines the second information reproducing/recording component r2 based on the reproduced result. The second information reproducing/recording component r2 has a good recorded state.

For example, in the second evaluation operation EO2, the controller 115 causes the magnetic head 110 to reproduce the recorded second information from the multiple second track recording components e2 and the at least two of the multiple first track recording components e1 recited above.

Thus, the one piece of information may be recorded in the multiple recording components included in each of the multiple recording tracks Tr (the first track Tr1, the second track Tr2, etc.). In such a case, it is favorable for the second track Tr2 to be physically proximal to the first track Tr1. Recording and reproducing to and from the multiple recording tracks Tr can be implemented in a short period of time. For example, it is favorable for the second track Tr2 to be positioned adjacent to the first track Tr1.

As recited above, by the first recording operation WO1 and the first reproduction operation RO1, the first information is recorded once in the multiple recording components of one of the multiple tracks Tr (the first track Tr1); and one recording component of the one track Tr is used as the actual recording (the final recording). The other recording components are used in another recording. An example of the other recording will now be described.

Figure 3A:
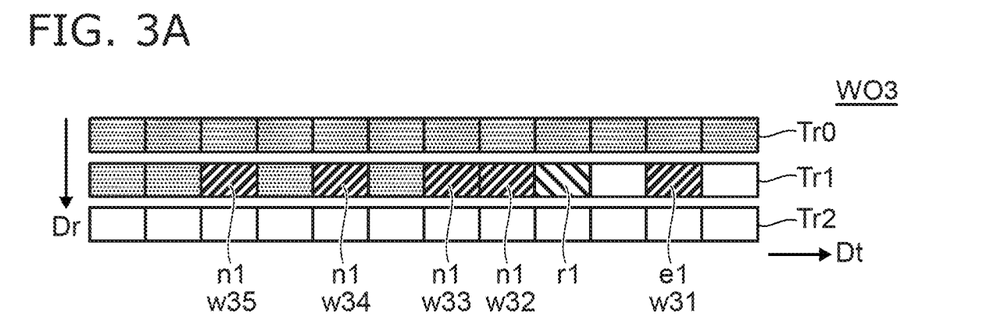
FIG. 3A to FIG. 3C are schematic views illustrating other operations of the magnetic recording and reproducing device according to the first embodiment.
Figure 3B:
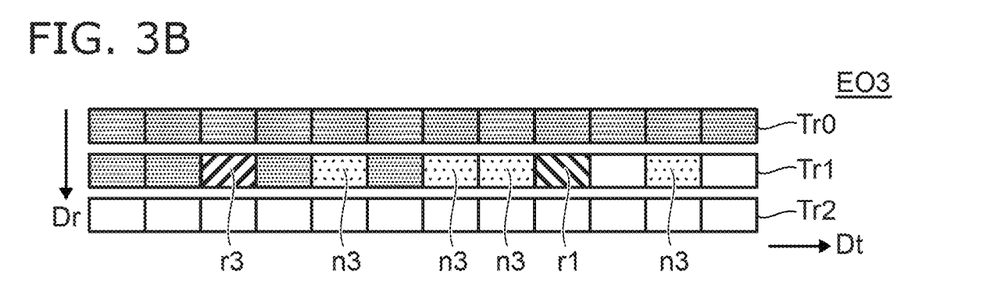
Figure 3C:
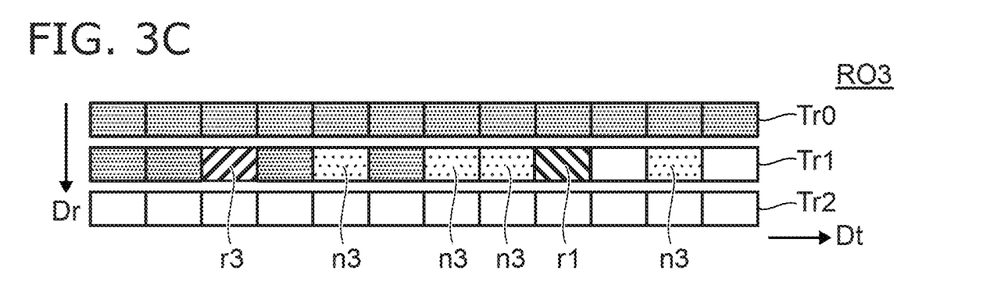

FIG. 3A to FIG. 3C are schematic views illustrating other operations of the magnetic recording and reproducing device according to the first embodiment.

FIG. 3A illustrates a third recording operation WO3. FIG. 3B illustrates a third evaluation operation EO3. FIG. 3C illustrates a third reproduction operation RO3.

As shown in FIG. 3A, at least one of the multiple first track recording components e1 recited above includes the non-first information reproducing/recording component n1 that is different from the first information reproducing/recording component r1. For example, the first information reproducing/recording component r1 and the non-first information reproducing/recording component n1 are determined by the first evaluation operation EO1, etc., recited above. The first information reproducing/recording component r1 and the non-first information reproducing/recording component n1 may be determined by the second evaluation operation EO2, etc.

For example, the at least two of the multiple first track recording components e1 recited above may include the non-first information reproducing/recording component n1 that is different from the first information reproducing/recording component r1.

The controller 115 causes the magnetic head 110 to implement the third recording operation WO3. The third recording operation WO3 records third information in the non-first information reproducing/recording component n1. In the example, the third information is recorded in recording components w31, w32, w33, w34, and w35. The recording components w32, w33, w34, and w35 are the non-first information reproducing/recording components n1. In other words, the recording components w32, w33, w34, and w35 are used as the non-first information reproducing/recording components n1 in the first evaluation operation EO1.

In other words, the first information is recorded once in the recording components w32, w33, w34, and w35; and subsequently, the recording components w32, w33, w34, and w35 are used for a new recording. In the example, the third information is recorded in the recording component w31 as well. The recording component w31 is one of the multiple first track recording components e1 of the first track Tr1.

As shown in FIG. 3B, a third information reproducing/recording component r3 is determined from the recording components in which the third information is recorded. In the example, the recording component w35 is used as the third information reproducing/recording component r3. The recording components w31, w32, w33, and w34 are used as non-third information reproducing/recording components n3.

As shown in FIG. 3C, the controller 115 causes the magnetic head 110 to implement the third reproduction operation RO3. In the third reproduction operation RO3, the recorded third information is reproduced from the third information reproducing/recording component r3. The third information reproducing/recording component r3 is one of at least two of the multiple non-first information reproducing/recording components n1.

Thus, other information (the third information) is recorded in the recording components that are not used in the recording (the final recording) of the first information. In the recording of the third information as well, the third information may be recorded once in each of the multiple recording components; and one of the multiple recording components may be ultimately used to record the third information.

In other words, for example, the non-first information reproducing/recording components n1 are determined in the first evaluation operation EO1. In such a case, the third recording operation WO3 includes causing the magnetic head 110 to record the third information in at least one of the non-first information reproducing/recording components n1. Then, the controller 115 causes the magnetic head 110 to implement the third reproduction operation RO3 of reproducing the third information from the third information reproducing/recording component r3. The third information reproducing/recording component r3 is the non-first information reproducing/recording component n1.

For example, the non-first information reproducing/recording component n1 is multiply provided. For example, the multiple non-first information reproducing/recording components n1 are determined in the first evaluation operation EO1. In such a case, the third recording operation WO3 includes causing the magnetic head 110 to record the third information in at least two of the multiple non-first information reproducing/recording components n1. Then, the controller 115 causes the magnetic head 110 to implement the third reproduction operation RO3 of reproducing the third information from the third information reproducing/recording component r3. The third information reproducing/recording component r3 is one of the at least two of the multiple non-first information reproducing/recording components n1 recited above.

The third recording operation WO3 may be as follows. The multiple recording tracks further include the second track Tr2. The at least two of the multiple first track recording components e1 recited above include the non-first information reproducing/recording component n1 that is different from the first information reproducing/recording component r1. The controller 115 causes the magnetic head 110 to implement the third recording operation WO3 of recording the third information in the non-first information reproducing/recording component n1. The third recording operation WO3 includes recording the third information in at least one of the non-first information reproducing/recording components n1 and in at least one of the multiple second track recording components e2 included in the second track Tr2. In such a case, the controller 115 causes the magnetic head 110 to implement the third reproduction operation RO3 of reproducing the third information from the third information reproducing/recording component r3 selected from the non-first information reproducing/recording component n1 and the at least one of the multiple second track recording components e2 included in the second track Tr2 recited above.

In the third evaluation operation EO3 recited above, the third information reproducing/recording component r3 is determined; and the non-third information reproducing/recording components n3 are determined. For example, the third information is ultimately recorded in the third information reproducing/recording component r3. The non-third information reproducing/recording components n3 are the recording components in which the third information is once recorded and are different from the third information reproducing/recording component r3. In the embodiment, for example, the non-third information reproducing/recording components n3 may be further used to record other information.

An example of an evaluation operation (e.g., the first evaluation operation EO1) will now be described.

Figure 4A:
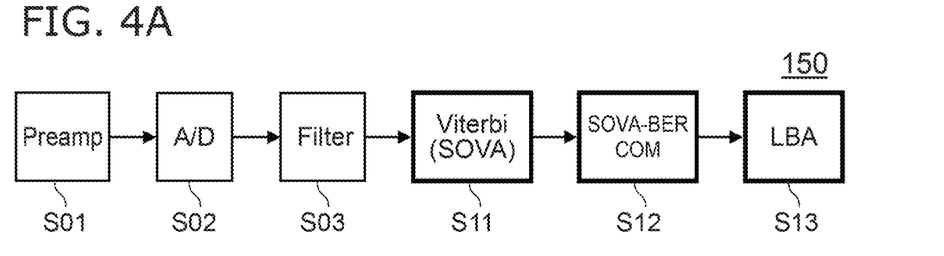
FIG. 4A and FIG. 4B are schematic views illustrating operations of magnetic recording and reproducing devices.
Figure 4B:
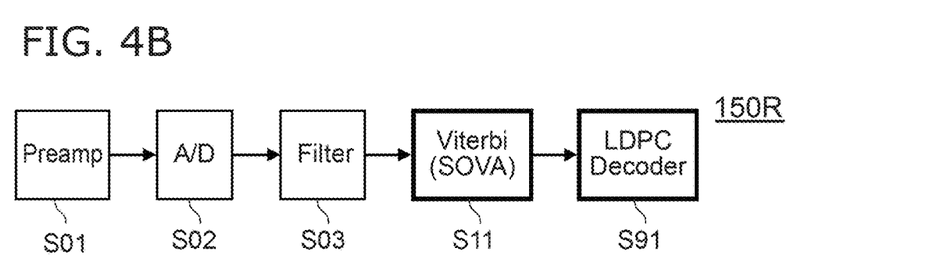

FIG. 4A and FIG. 4B are schematic views illustrating operations of magnetic recording and reproducing devices.

FIG. 4A illustrates the operation of the magnetic recording and reproducing device 150 according to the embodiment. FIG. 4B illustrates the operation of a magnetic recording and reproducing device 150R of a reference example. In the magnetic recording and reproducing device 150R of the reference example, the first information is recorded in one recording component.

In the magnetic recording and reproducing device 150, the information is recorded in multiple recording components (a sector) of the magnetic recording medium 80. The information that is recorded is sensed by the magnetic head 110. The signal that is sensed is supplied to the controller 115.

In the magnetic recording and reproducing device 150 as shown in FIG. 4A, the signal that is sensed is input to a preamplifier (step S01); and A/D conversion is performed (step S02). Then, filtering of the signal is performed (step S03). For example, the processing recited above is performed for each of the multiple recording components in which the information is recorded. Further, for example, the BER (Bit Error Rate) for the soft-decision state (Soft Output Viterbi Algorithm (SOVA)) is calculated for each of the multiple recording components (step S11). Then, the SOVA-BER is compared for each of the multiple recording components (step S12). Based on the result of the comparison, the memory region address (the Logical Block Address (LBA)) is controlled for one designated recording component (the first information reproducing/recording component r1) (step S13).

In other words, the information that is recorded is reproduced from the multiple first track recording components e1 in which the first information is recorded; and the recording quality (the BER) for SOVA is compared. Then, for example, the recording component having good recording quality (e.g., the best recording quality) is used as the first information reproducing/recording component r1. The first information reproducing/recording component r1 is associated with a prescribed LBA. In other words, the first information is ultimately recorded in the first information reproducing/recording component r1. Then, the other recording components (the non-first information reproducing/recording components n1) are controlled as being unused regions. For example, the other recording components are used in a subsequent recording.

On the other hand, in the magnetic recording and reproducing device 150R as shown in FIG. 4B, the first information is recorded in one recording component; and the information that is recorded is sensed from the one recording component. The signal that is sensed is input to a preamplifier (step S01); A/D conversion is performed (step S02); and filtering is performed (step S03). Then, a soft decision of the information is performed using SOVA (step S11). Then, LDPC (Low-density parity-check code) decoding is performed as a hard decision (step S91). In other words, in the reference example, the decoding of the information is performed by using the soft decision of the Viterbi algorithm and the hard decision of LDPC in combination. The determination of the recording quality is performed by comparing the error rate of the decoded information.

In the embodiment, the first information that is to be recorded is recorded in multiple recording components; and the recording component that is recorded in a good state is used in the recording (the final recording) of the first information. Then, the other recording components are used to record other information. Thereby, for example, the margin of the design of one recording component widens; and, for example, the recording density can be increased.

Figure 5:
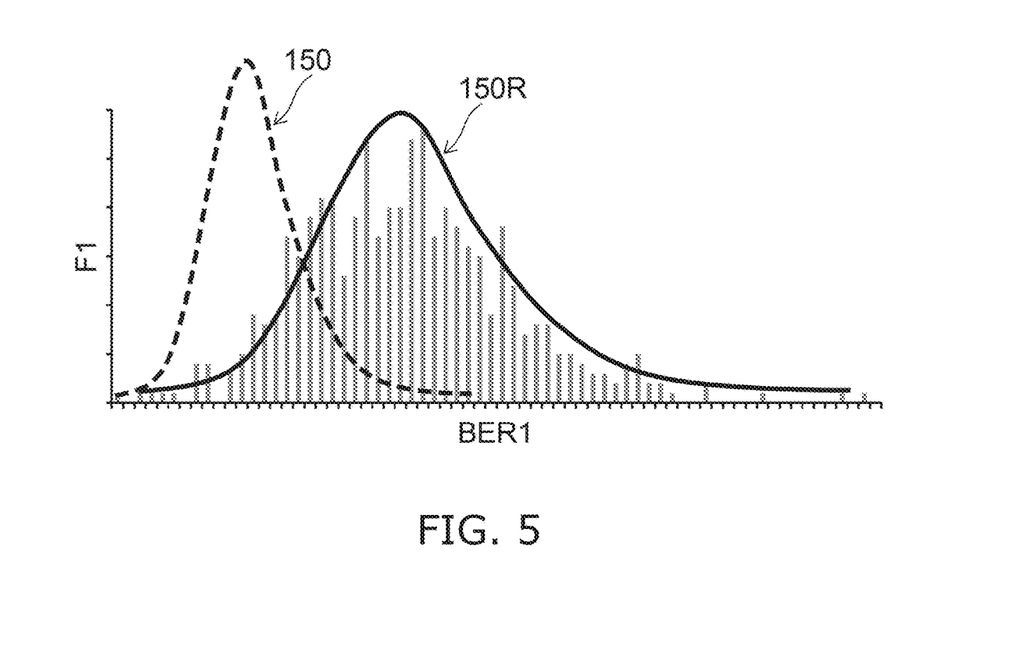
FIG. 5 is a graph of characteristics of the magnetic recording and reproducing devices.

FIG. 5 is a graph of characteristics of the magnetic recording and reproducing devices.

In FIG. 5, the horizontal axis is the recording quality (the bit error rate) BER1. The vertical axis is a frequency F1. FIG. 5 illustrates the characteristics of the magnetic recording and reproducing device 150 according to the embodiment and the magnetic recording and reproducing device 150R of the reference example. In the magnetic recording and reproducing device 150R of the reference example, each value of the recording quality BER1 (e.g., the SOVA-BER) has the frequency F1. For example, when the recording and reproducing are multiply tried, the case where the recording quality BER1 is low occurs at a constant probability. For example, the increase of the recording density is limited to obtain a high recording quality BER1.

The recording quality BER1 is high in the magnetic recording and reproducing device 150 according to the embodiment as shown in FIG. 5. This is because, in the embodiment, the information (the first information) that is to be recorded is once recorded in multiple recording components; and subsequently, the recording component (the first information reproducing/recording component r1) that is recorded in a good recorded state is used as the final recording of the first information. Then, the non-first information reproducing/recording components n1 that are not used in the final recording are used to record other information.

In other words, in the magnetic recording and reproducing device 150, the recording in which the recording quality BER1 is high (the left-side portion of FIG. 5) is selected from the distribution of the recording quality of the magnetic recording and reproducing device 150R of the reference example. The recording in which the recording quality BER1 is low (the right-side portion of FIG. 5) is not selected and is used to record other information. For the portion of the recording in which the recording quality BER1 is low, the recording and the releasing as unused regions (the control as unused regions) are performed repeatedly until a high recording quality BER1 is obtained.

Therefore, the quality of the recording and reproducing is high in the embodiment. The fluctuation of the recording and reproducing is small. The average error rate can be improved. The recording density can be increased by this improvement.

For example, in the reference example, the design of the recording density is performed so that one recording is successful. Conversely, in the embodiment, the information (the first information) that is to be recorded is recorded in multiple recording components. Then, for example, the recording quality is compared using the SOVA-BER. Then, the recording in which the recording quality is high remains. Thereby, the distribution of the recording quality can be shifted to the high-quality side. The linear recording density (bpi) can be improved by the shift amount of the recording quality. According to the embodiment, the recording density can be increased while maintaining high-quality recording and reproducing.

Thus, in the embodiment, the controller 115 performs the first evaluation operation EO1. The first evaluation operation EO1 evaluates the recorded states of the at least two of the multiple first track recording components e1 recited above. The at least two of the multiple first track recording components e1 recited above include the first information reproducing/recording component r1 and the non-first information reproducing/recording component n1. The non-first information reproducing/recording component n1 is different from the first information reproducing/recording component r1. For example, the recorded state of the first information reproducing/recording component is near the first information to be recorded. For example, the first difference is the difference between the first information and the recorded state of the first information reproducing/recording component r1. The second difference is the difference between the first information and the recorded state of the non-first information reproducing/recording component n1. The first difference is smaller than the second difference.

For example, the recorded state of the first information reproducing/recording component r1 is the best among the recording components in which the first information is recorded (the at least two of the multiple first track recording components e1 recited above). The recorded state of the first information reproducing/recording component r1 is nearest the first information to be recorded. For example, the at least two of the multiple first track recording components e1 recited above are made of the first information reproducing/recording component r1, and the non-first information reproducing/recording component n1 that is different from the first information reproducing/recording component r1. At this time, the difference (the first difference) between the first information and the recorded state of the first information reproducing/recording component r1 is smaller than the difference (the second difference) between the first information and the recorded state of the non-first information reproducing/recording component n1. The non-first information reproducing/recording component n1 may be multiply provided. At this time, the first difference recited above is smaller than the differences between the first information and the recorded state of each of the multiple non-first information reproducing/recording components n1. In other words, the recorded state of the first information reproducing/recording component r1 is the best.

As recited above, the first evaluation operation EO1 may include, for example, deriving the soft output Viterbi bit error rate.

In the embodiment as recited above, the controller 115 implements a first association operation based on the result of the first evaluation operation EO1. For example, the first association operation associates the first information reproducing/recording component r1 with a logical address relating to the first information to be recorded.

Figure 6:
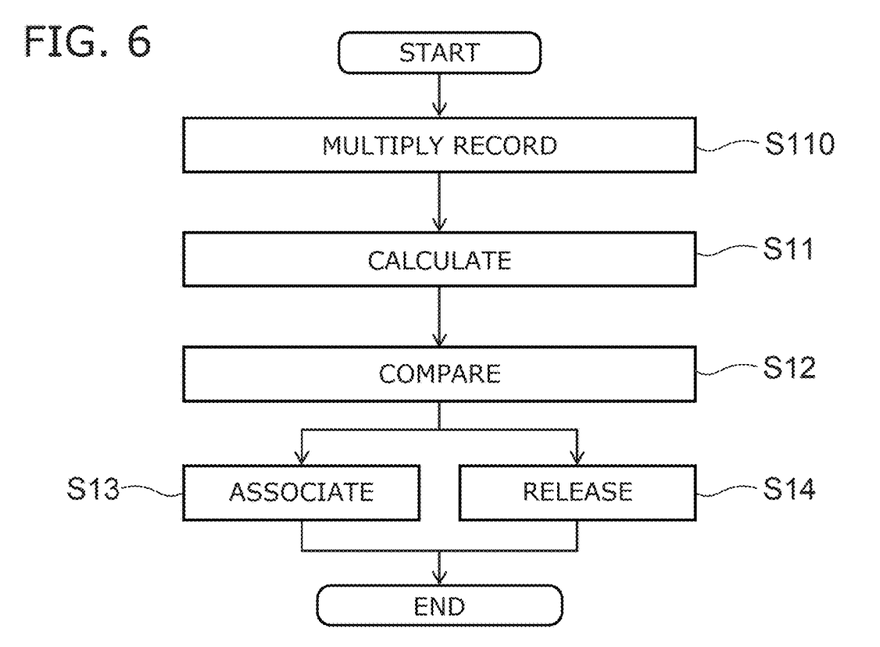
FIG. 6 is a flowchart illustrating the operation of the magnetic recording and reproducing device according to the embodiment.

FIG. 6 is a flowchart illustrating the operation of the magnetic recording and reproducing device according to the embodiment.

In the embodiment as shown in FIG. 6, the recording of multiple recording components (a sector) is performed (step S110). The SOVA-BER is calculated for each of the recorded multiple recording components (step S11). The calculation result of the SOVA-BER is compared for each of the multiple recording components (step S12). Then, for example, the recording component that has the best SOVA-BER is associated with an address (step S13). For example, the recording component that has the best SOVA-BER is controlled, by an LBA controller, as having data recorded. Then, the other recording components are released (step S14). For example, the other recording components are released by the LBA controller as being an unused sector.

Thus, in the embodiment, for example, the magnetic recording medium 80, the magnetic head 110 (the recording head and the reproducing head), and the controller 115 are provided. The controller 115 includes, for example, a decoding circuit, a comparator, and a logical address controller. For example, the decoding circuit performs the soft decision of the reproduction signal decoding reproduced by the magnetic head. For example, the comparator compares the error rate (the SOVA-BER) of the soft-decision information. When recording the information in the embodiment, information of the same content is recorded in multiple recording components. Then, the SOVA-BER is calculated by reproducing the states of the multiple recording components. The SOVA-BER values that are obtained are compared. For example, the recording component that has the lowest error rate (SOVA-BER) is sorted from the other recording components. The position of the recording component having the lowest error rate is associated with a logical address by a logical address controller. The other recording components (the other recording positions) are released as unused regions by the logical address controller.

According to the embodiment, a magnetic recording and reproducing device in which the recording density can be increased can be provided.

In the embodiment, for example, the recording operation is completed in one rotation of the magnetic disk. In the case where the first track Tr1 and the second track Tr2 are used in the recording operation, the recording operation is completed in two rotations. Therefore, for example, the latency of the recording operation is stable.

For example, in a conventional magnetic recording and reproducing device, the BER is used after the hard decision of LDPC to determine the recording quality. The BER after the hard decision is low, e.g., $10^{-14}$ to $10^{-15}$. It is difficult to compare the quality using the error rate. For example, in the case where the quality is discriminated by an SNR measurement from the reproduction waveform prior to the decoding, a calculation circuit of the SNR is added to evaluate the reproduction waveform in a wide band.

Conversely, in the embodiment, for example, the recording quality is determined by comparing the soft-decision information of the SOVA-BER. Therefore, the additional functions are small-scale compared to those of the conventional magnetic recording and reproducing device.

In the magnetic recording and reproducing device 150R of the reference example, for example, the latency of the recording operation is undetermined. In other words, the pass/fail determination is performed by performing the verify for each recording of the information; and retries of the recording operation are performed repeatedly. Therefore, the number of recordings until successful changes. Therefore, the latency of the recording operation is unstable.

Conversely, in the embodiment, the same information is recorded in multiple recording components; subsequently, the recording quality is evaluated; and the recording component that is ultimately recorded is determined. In other words, the recording operation is completed prior to performing the evaluation of the recording quality; and the latency of the recording operation is stable. The prediction of the latency is easy. A stable and easy-to-use magnetic recording and reproducing device can be provided.

In the embodiment, the number of the at least two of the multiple first track recording components e1 recited above is, for example, three or more. In other words, in the first recording operation WO1, the number of recording components in which the first information is recorded is, for example, three or more.

Second Embodiment

In the embodiment as well, the first recording operation WO1 and the first reproduction operation RO1 recited above are performed. In other words, as the first recording operation WO1, the controller 115 causes the magnetic head 110 to record the first information in at least two of the multiple first track recording components e1 included in the first track. Then, the controller 115 causes the magnetic head 110 to reproduce the first information from the first information reproducing/recording component r1 of one of the at least two of the multiple first track recording components e1 recited above. In the embodiment, the first evaluation operation EO1 differs from that of the first embodiment.

Figure 7:
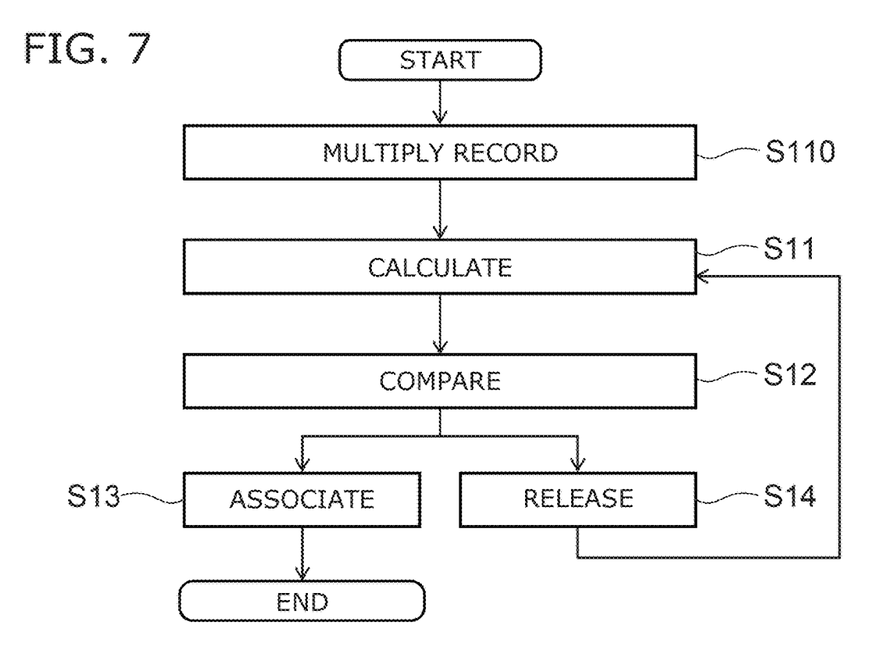
FIG. 7 is a flowchart illustrating the operation of the magnetic recording and reproducing device according to the embodiment.

FIG. 7 is a flowchart illustrating the operation of the magnetic recording and reproducing device according to the embodiment.

In the embodiment as shown in FIG. 7, the recording of multiple recording components (a sector) is performed (step S110). The SOVA-BER of at least one of the recorded multiple recording components is calculated (step S11). The calculation result of the SOVA-BER is compared to a threshold (step S12). Then, for example, in the case where the calculation result of the SOVA-BER is better than the threshold, the recording component is associated with an address (step S13). For example, in the case where the calculation result of the SOVA-BER is the threshold or more, the recording component is released (step S14). Then, the SOVA-BER is calculated for the other recording components (step S11). Steps S11, S12, and S13 are implemented for the other recording components.

In other words, in the embodiment, the SOVA-BER is calculated for at least one recording component in the first evaluation operation EO1 (step S11 of FIG. 7); and in the case where the result is better than a prescribed value, the recording component is used as the final recording of the first information. Then, the other recording components are released.

In the embodiment, for example, the controller 115 implements the first evaluation operation EO1. In the first evaluation operation EO1, the recorded state of at least one of the at least two of the multiple first track recording components e1 is evaluated.

The difference between the recorded state of the first information reproducing/recording component r1 and the information (the first information) that is to be recorded is less than the threshold.

For example, the recorded state of the at least one of the at least two of the multiple first track recording components e1 is evaluated; and in the case where the evaluation result is less than a predetermined threshold (a good recorded state), the recording component is used as the first information reproducing/recording component r1. Then, the non-first information reproducing/recording component n1 of the at least two of the multiple first track recording components e1 is released. The non-first information reproducing/recording component n1 is used in the recording of other information (e.g., the third information), etc.

Thus, in the embodiment, the information that is to be recorded (the first information) is recorded in multiple recording components when recording the information. The recorded state of at least one of the multiple recording components is evaluated. For example, an evaluation of the SOVA-BER is performed. Then, if the evaluation result is less than the threshold (e.g., the quality does not fall below a correctable error limit), the recording component is associated with a logical address. In the case where the evaluation result is not less than the threshold (e.g., the quality is not more than the correctable error limit), the recording component is released as an unused region; and step S11 is implemented for the other recording components.

In the embodiment as well, a magnetic recording and reproducing device in which the recording density can be increased can be provided.

In the embodiment as well, the number of the at least two of the multiple first track recording components e1 recited above is, for example, three or more.

In the first and second embodiments recited above, it is favorable for the recording speed, the number of recording components in which the information to be recorded is recorded, and the transfer speed to satisfy the following relationship. Ws (bit/second) is the recording speed when the magnetic head 110 records the first information in one of the at least two of the multiple first track recording components e1 recited above. n (n being an integer not less than 2) is the number of the at least two of the multiple first track recording components e1 recited above (the number of recording components in which the first information is recorded). Is (bit/second) is the transfer speed of the signal of the interface 116. The signal is supplied to the controller 115 and is the basis of the first information. It is favorable for the recording speed Ws (bit/second), the number n, and the transfer speed Is (bit/second) to satisfy Is≥(Ws/n).

In the embodiment, n times the information transferred via the interface 116 is recorded once when recording. In other words, the internal transfer speed of the magnetic recording and reproducing device when recording is reduced to be 1/n. By setting the upper limit of n to satisfy Is≥(Ws/n), the internal transfer speed can be prevented from falling below the transfer speed Is of the signal of the interface 116.

Thereby, a high recording speed can be maintained; and a high-speed recording operation is obtained.

The embodiments include, for example, the following features.

Feature 1

A magnetic recording and reproducing device, comprising:

a magnetic recording medium including multiple recording tracks;

a magnetic head; and a controller, the multiple recording tracks including a first track, the controller causing the magnetic head to implement a first recording operation of recording first information in at least two of multiple first track recording components included in the first track, the controller causing the magnetic head to implement a first reproduction operation of reproducing the first information from a first information reproducing/recording component of one of the at least two of the multiple first track recording components.

Feature 2

The magnetic recording and reproducing device according to Feature 1, wherein the multiple recording tracks further include a second track, the controller causes the magnetic head to implement a second recording operation of recording second information in at least one of the multiple first track recording components and in at least one of multiple second track recording components included in the second track, and the controller causes the magnetic head to implement a second reproduction operation of reproducing the second information from a second information reproducing/recording component of one selected from the at least one of the multiple first track recording components and the at least one of the multiple second track recording components.

Feature 3

The magnetic recording and reproducing device according to Feature 2, wherein the second track is positioned adjacent to the first track.

Feature 4

The magnetic recording and reproducing device according to one of Features 1 to 3, wherein the at least two of the multiple first track recording components include a non-first information reproducing/recording component different from the first information reproducing/recording component, and the controller causes the magnetic head to further implement a third recording operation of recording third information in the non-first information reproducing/recording component.

Feature 5

The magnetic recording and reproducing device according to Feature 4, wherein the multiple first track recording components include a recording component that is different from the non-first information reproducing/recording component and different from the first information reproducing/recording component, the third recording operation includes recording the third information in at least one of the non-first information reproducing/recording components and in the recording component that is different from the non-first information reproducing/recording component and different from the first information reproducing/recording component, and the controller causes the magnetic head to implement a third reproduction operation of reproducing the third information from a third information reproducing/recording component selected from the non-first information reproducing/recording component and the recording component that is different from the non-first information reproducing/recording component and different from the first information reproducing/recording component.

Feature 6

The magnetic recording and reproducing device according to Feature 4, wherein the non-first information reproducing/recording component is multiply provided, the third recording operation includes causing the magnetic head to record the third information in at least two of the multiple non-first information reproducing/recording components, and the controller causes the magnetic head to implement a third reproduction operation of reproducing the third information from a third information reproducing/recording component of one of the at least two of the multiple non-first information reproducing/recording components.

Feature 7

The magnetic recording and reproducing device according to Feature 1, wherein the multiple recording tracks further include a second track, the at least two of the multiple first track recording components include a non-first information reproducing/ recording component that is different from the first information reproducing/recording component, the controller causes the magnetic head to further implement a third recording operation of recording third information in the non-first information reproducing/recording component, the third recording operation includes recording the third information in at least one of the non-first information reproducing/recording components and in at least one of multiple second track recording components included in the second track, and the controller causes the magnetic head to implement a third reproduction operation of reproducing the third information from a third information reproducing/recording component selected from the non-first information reproducing/recording component and the at least one of the multiple second track recording components included in the second track.

Feature 8

The magnetic recording and reproducing device according to one of Features 1 to 7, wherein the controller further implements a first evaluation operation of determining the first information reproducing/recording component based on a recorded state of the at least two of the multiple first track recording components, and the first reproduction operation includes reproducing the first information from the first information reproducing/recording component determined by the first evaluation operation.

Feature 9

The magnetic recording and reproducing device according to one of Features 1 to 7, wherein the controller further implements a first evaluation operation of evaluating a recorded state of at least one of the at least two of the multiple first track recording components, and the difference between the first information and the recorded state of the first information reproducing/recording component is less than a threshold.

Feature 10

The magnetic recording and reproducing device according to one of Features 1 to 3, wherein the controller further implements a first evaluation operation of evaluating a recorded state of the at least two of the multiple first track recording components, the at least two of the multiple first track recording components include a non-first information reproducing/recording component that is different from the first information reproducing/recording component, and a first difference between the first information and a recorded state of the first information reproducing/recording component is smaller than a second difference between the first information and a recorded state of the non-first information reproducing/recording component.

Feature 11

The magnetic recording and reproducing device according to one of Features 1 to 3, wherein the at least two of the multiple first track recording components are made of the first information reproducing/recording component and a non-first information reproducing/recording component that is different from the first information reproducing/recording component, and a first difference between the first information and a recorded state of the first information reproducing/recording component is smaller than a second difference between the first information and a recorded state of the non-first information reproducing/recording component.

Feature 12

The magnetic recording and reproducing device according to Feature 11, wherein the non-first information reproducing/recording component is multiply provided, and the first difference is smaller than the differences between the first information and the recorded state of each of the multiple non-first information reproducing/recording components.

Feature 13

The magnetic recording and reproducing device according to one of Features 8 to 12, wherein the first evaluation operation includes deriving a soft output Viterbi bit error rate.

Feature 14

The magnetic recording and reproducing device according to one of Features 8 to 13, wherein the controller implements a first association operation of associating the first information reproducing/recording component with a logical address relating to the first information based on a result of the first evaluation operation.

Feature 15

The magnetic recording and reproducing device according to one of Features 1 to 11, wherein the number of the at least two of the multiple first track recording components is three or more.

Feature 16

The magnetic recording and reproducing device according to one of Features 1 to 15, wherein a recording speed Ws (bit/second) when the magnetic head records the first information in one of the at least two of the multiple first track recording components, a number n of the at least two of the multiple first track recording components, and a transfer speed Is (bit/second) of a signal that is supplied to the controller and is the basis of the first information satisfy $Is \geq (Ws/n)$.

Feature 17

The magnetic recording and reproducing device according to Feature 1, wherein the multiple recording tracks further include a second track, the controller causes the magnetic head to implement a second recording operation of recording second information in the at least two of the multiple first track recording components and in at least one of multiple second track recording components included in the second track, and the controller causes the magnetic head to implement a second reproduction operation of reproducing the second information from a second information reproducing/recording component of one selected from the at least two of the multiple first track recording components and the at least one of the multiple second track recording components.

Feature 18

The magnetic recording and reproducing device according to Feature 17, wherein the second track is positioned adjacent to the first track.

Feature 19

The magnetic recording and reproducing device according to Feature 17 or 18, wherein the at least two of the multiple first track recording components include a non-first information reproducing/recording component that is different from the first information reproducing/recording component, and the controller causes the magnetic head to further implement a third recording operation of recording third information in the non-first information reproducing/recording component.

Feature 20

The magnetic recording and reproducing device according to Feature 19, wherein
the non-first information reproducing/recording component is multiply provided,
the third recording operation includes causing the magnetic head to record the third information in at least two of the multiple non-first information reproducing/recording components, and
the controller causes the magnetic head to implement a third reproduction operation of reproducing the third information from a third information reproducing/recording component of one of the at least two of the multiple non-first information reproducing/recording components.

Feature 21

The magnetic recording and reproducing device according to one of Features 17 to 20, wherein
the controller further implements a first evaluation operation of determining the first information reproducing/recording component based on a recorded state of the at least two of the multiple first track recording components, and
the first reproduction operation includes reproducing the first information from the first information reproducing/recording component determined by the first evaluation operation.

Feature 22

The magnetic recording and reproducing device according to one of Features 17 to 20, wherein
the controller further implements a first evaluation operation of evaluating a recorded state of at least one of the at least two of the multiple first track recording components, and
a difference between the first information and the recorded state of the first information reproducing/recording component is less than a threshold.

Feature 23

The magnetic recording and reproducing device according to Feature 17 or 18, wherein
the controller further implements a first evaluation operation of evaluating a recorded state of the at least two of the multiple first track recording components,
the at least two of the multiple first track recording components include a non-first information reproducing/recording component that is different from the first information reproducing/recording component, and
a first difference between the first information and a recorded state of the first information reproducing/recording component is smaller than a second difference between the first information and a recorded state of the non-first information reproducing/recording component.

Feature 24

The magnetic recording and reproducing device according to Feature 17 or 18, wherein
the at least two of the multiple first track recording components are made of the first information reproducing/recording component and a non-first information reproducing/recording component that is different from the first information reproducing/recording component, and
a first difference between the first information and a recorded state of the first information reproducing/recording component is smaller than a second difference between the first information and a recorded state of the non-first information reproducing/recording component.

Feature 25

The magnetic recording and reproducing device according to Feature 24, wherein the non-first information reproducing/recording component is multiply provided, and
the first difference is smaller than the differences between the first information and the recorded state of each of the multiple non-first information reproducing/recording components.

Feature 26

The magnetic recording and reproducing device according to one of Features 21 to 25, wherein the first evaluation operation includes deriving a soft output Viterbi bit error rate.

Feature 27

The magnetic recording and reproducing device according to one of Features 21 to 26, wherein the controller implements a first association operation of associating the first information reproducing/recording component with a logical address based on a result of the first evaluation operation, the logical address relating to the first information.

Feature 28

The magnetic recording and reproducing device according to one of Features 17 to 24, wherein the number of the at least two of the multiple first track recording components is three or more.

Feature 29

The magnetic recording and reproducing device according to one of Features 17 to 28, wherein
a recording speed Ws (bit/second) when the magnetic head records the first information in one of the at least two of the multiple first track recording components, a number n of the at least two of the multiple first track recording components, and a transfer speed Is (bit/second) of a signal that is supplied to the controller and is the basis of the first information satisfy $Is \geq (Ws/n)$.

According to the embodiments, a magnetic recording and reproducing device in which the recording density can be increased can be provided.

In the specification of the application, "perpendicular" and "parallel" refer to not only strictly perpendicular and strictly parallel but also include, for example, the fluctuation due to manufacturing processes, etc. It is sufficient to be substantially perpendicular and substantially parallel.

Hereinabove, exemplary embodiments of the invention are described with reference to specific examples. However, the embodiments of the invention are not limited to these specific examples. For example, one skilled in the art may similarly practice the invention by appropriately selecting specific configurations of components included in magnetic recording and reproducing devices such as magnetic recording media, magnetic heads, controllers, etc., from known art. Such practice is included in the scope of the invention to the extent that similar effects thereto are obtained.

Further, any two or more components of the specific examples may be combined within the extent of technical feasibility and are included in the scope of the invention to the extent that the purport of the invention is included.

Moreover, all magnetic recording and reproducing devices practicable by an appropriate design modification by one skilled in the art based on the magnetic recording and reproducing devices described above as embodiments of the invention also are within the scope of the invention to the extent that the spirit of the invention is included.

Various other variations and modifications can be conceived by those skilled in the art within the spirit of the invention, and it is understood that such variations and modifications are also encompassed within the scope of the invention.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the invention.

What is claimed is:

1. A magnetic recording and reproducing device, comprising:
a magnetic recording medium including a plurality of recording tracks;
a magnetic head; and
a controller,
the plurality of recording tracks including a first track,
the controller causing the magnetic head to implement a first recording operation of recording first information in at least two of a plurality of first track recording components included in the first track,
the controller causing the magnetic head to implement a first reproduction operation of reproducing the first information from a first information reproducing/recording component of one of the at least two of the plurality of first track recording components,
wherein
the plurality of recording tracks further includes a second track,
the controller causes the magnetic head to implement a second recording operation of recording second information in at least one of the plurality of first track recording components and in at least one of a plurality of second track recording components included in the second track, and
the controller causes the magnetic head to implement a second reproduction operation of reproducing the second information from a second information reproducing/recording component, the second information reproducing/recording component being of one selected from the at least two of the plurality of first track recording components and the at least one of the plurality of second track recording components.

2. The device according to claim 1, wherein the second track is positioned adjacent to the first track.

3. The device according to claim 1, wherein
the at least two of the plurality of first track recording components include a non-first information reproducing/recording component different from the first information reproducing/recording component, and
the controller causes the magnetic head to further implement a third recording operation of recording third information in the non-first information reproducing/recording component.

4. The device according to claim 3, wherein
the plurality of first track recording components includes a recording component, the recording component being different from the non-first information reproducing/recording component and different from the first information reproducing/recording component,
the third recording operation includes recording the third information in the recording component and in at least one of the non-first information reproducing/recording components, the recording component being different from the non-first information reproducing/recording component and different from the first information reproducing/recording component, and the controller causes the magnetic head to implement a third reproduction operation of reproducing the third information from a third information reproducing/recording component, the third information reproducing/recording component being selected from the non-first information reproducing/recording component and the recording component, the recording component being different from the non-first information reproducing/recording component and different from the first information reproducing/recording component.

5. The device according to claim 3, wherein
the non-first information reproducing/recording components is provided in a plurality,
the third recording operation includes causing the magnetic head to record the third information in at least two of the plurality of non-first information reproducing/recording components, and
the controller causes the magnetic head to implement a third reproduction operation of reproducing the third information from a third information reproducing/recording component of one of the at least two of the plurality of non-first information reproducing/recording components.

6. A magnetic recording and reproducing device, comprising:
a magnetic recording medium including a plurality of recording tracks;
a magnetic head; and
a controller,
the plurality of recording tracks including a first track,
the controller causing the magnetic head to implement a first recording operation of recording first information in at least two of a plurality of first track recording components included in the first track,
the controller causing the magnetic head to implement a first reproduction operation of reproducing the first information from a first information reproducing/recording component of one of the at least two of the plurality of first track recording components, wherein
the plurality of recording tracks further includes a second track,
the at least two of the plurality of first track recording components include a non-first information reproducing/recording component different from the first information reproducing/recording component,
the controller causes the magnetic head to further implement a third recording operation of recording third information in the non-first information reproducing/recording component,
the third recording operation includes recording the third information in at least one of the non-first information reproducing/recording components and in at least one of a plurality of second track recording components included in the second track, and
the controller causes the magnetic head to implement a third reproduction operation of reproducing the third information from a third information reproducing/recording component selected from the non-first information reproducing/recording component and the at least one of the plurality of second track recording components included in the second track.

7. The device according to claim 1, wherein
the controller further implements a first evaluation operation of determining the first information reproducing/ recording component based on a recorded state of the at least two of the plurality of first track recording components, and the first reproduction operation includes reproducing the first information from the first information reproducing/recording component determined by the first evaluation operation.

8. The device according to claim 1, wherein
the controller further implements a first evaluation operation of evaluating a recorded state of at least one of the at least two of the plurality of first track recording components, and
a difference between the first information and the recorded state of the first information reproducing/recording component is less than a threshold.

9. A magnetic recording and reproducing device, comprising:
a magnetic recording medium including a plurality of recording tracks;
a magnetic head; and
a controller,
the plurality of recording tracks including a first track,
the controller causing the magnetic head to implement a first recording operation of recording first information in at least two of a plurality of first track recording components included in the first track,
the controller causing the magnetic head to implement a first reproduction operation of reproducing the first information from a first information reproducing/recording component of one of the at least two of the plurality of first track recording components, wherein
the controller further implements a first evaluation operation of evaluating a recorded state of the at least two of the plurality of first track recording components,
the at least two of the plurality of first track recording components include a non-first information reproducing/recording component different from the first information reproducing/recording component, and
a first difference between the first information and a recorded state of the first information reproducing/recording component is smaller than a second difference between the first information and a recorded state of the non-first information reproducing/recording component.

10. A magnetic recording and reproducing device, comprising:
a magnetic recording medium including a plurality of recording tracks;
a magnetic head; and
a controller,
the plurality of recording tracks including a first track,
the controller causing the magnetic head to implement a first recording operation of recording first information in at least two of a plurality of first track recording components included in the first track,
the controller causing the magnetic head to implement a first reproduction operation of reproducing the first information from a first information reproducing/recording component of one of the at least two of the plurality of first track recording components, wherein
the at least two of the plurality of first track recording components are made of the first information reproducing/recording component and a non-first information reproducing/recording component, the non-first information reproducing/recording component being different from the first information reproducing/recording component, and
a first difference between the first information and a recorded state of the first information reproducing/recording component is smaller than a second difference between the first information and a recorded state of the non-first information reproducing/recording component.

11. The device according to claim 10, wherein
the non-first information reproducing/recording component is provided in a plurality, and
the first difference is smaller than the differences between the first information and the recorded state of each of the plurality of non-first information reproducing/recording components.

12. The device according to claim 7, wherein the first evaluation operation includes deriving a soft output Viterbi bit error rate.

13. The device according to claim 7, wherein the controller implements a first association operation of associating the first information reproducing/recording component with a logical address based on a result of the first evaluation operation, the logical address relating to the first information.

14. The device according to claim 1, wherein the number of the at least two of the plurality of first track recording components is three or more.

15. The device according to claim 1, wherein
a recording speed Ws (bit/second) when the magnetic head records the first information in one of the at least two of the plurality of first track recording components, a number n of the at least two of the plurality of first track recording components, and a transfer speed Is (bit/second) of a signal supplied to the controller and used as a basis of the first information satisfy
Is≥(Ws/n).

* * * * *